United States Patent [19]

de Mets

[11] 4,140,455

[45] Feb. 20, 1979

[54] CONTINUOUSLY OPERATING PRESS

[75] Inventor: Albert de Mets, Roeselaare, Belgium

[73] Assignee: Konstruktiewerkhuizen de Mets N.V., Belgium

[21] Appl. No.: 832,818

[22] Filed: Sep. 13, 1977

[30] Foreign Application Priority Data

Sep. 13, 1976 [DE] Fed. Rep. of Germany ....... 2641174
Aug. 10, 1977 [DE] Fed. Rep. of Germany ....... 2736099

[51] Int. Cl.² .............................................. B29C 15/00
[52] U.S. Cl. ...................................... 425/371; 100/151
[58] Field of Search ................ 425/371, 335; 264/120, 264/122; 100/151

[56] References Cited

U.S. PATENT DOCUMENTS

| | | | |
|---|---|---|---|
| 3,621,524 | 11/1971 | Sherwood | 425/371 X |
| 3,837,774 | 9/1974 | Ross et al. | 425/371 X |
| 3,883,285 | 5/1975 | de Mets | 425/371 |
| 3,907,473 | 9/1975 | de Mets | 425/371 X |
| 3,994,648 | 11/1976 | Kornylak et al. | 425/371 X |
| 4,004,873 | 1/1977 | de Mets | 425/371 |

*Primary Examiner*—Robert L. Spicer, Jr.

*Attorney, Agent, or Firm*—Craig & Antonelli

[57] ABSTRACT

A continuously operating double belt press is provided in which the belts are formed from a plurality of articulated plates, which are in turn surrounded by endless steel bands which are pressed by low-pressure rollers and the plates against the material being compressed. Downstream of the plate belts, within the interior space surrounded by the pressing bands, respective large high-pressure rollers are disposed in facing relationship to one another. In order to improve the distribution and transfer of forces in the high-pressure zone adjacent the high-pressure rollers, a high-pressure endless belt is provided which surrounds the respective high-pressure rollers and runs between the high-pressure rollers and the pressing band. In preferred embodiments, reversing rollers are provided for the high-pressure endless belt, which reversing rollers serve to additionally press the high-pressure endless belt against the pressing band at a position spaced from the high-pressure rollers. Reversing rollers for this high-pressure endless belt are also provided spaced from the pressing band, and which serve to prevent sideways slippage of the high-pressure endless belt.

20 Claims, 3 Drawing Figures

CONTINUOUSLY OPERATING PRESS

BACKGROUND AND SUMMARY OF THE INVENTION

The present invention relates to an improved press for producing boards such as chipboards, fiberboards, and the like. My recently issued U.S. Pat. No. 4,004,873 discloses the general type of press which the present invention also relates to. To the extent necessary for an understanding of the present invention, the subject matter of this patent is incorporated herein by reference thereto.

The above-noted patent relates to a continuously operating press, especially a prepress, for a mat for manufacturing board, such as chipboard, fiberboard, or the like, with two endless-plate conveyors or belts, consisting of plates articulated together, said conveyors being mounted one above the other and traveling about axes located horizontally and parallel to one another, the sections of said conveyor facing one another being drivable in the same direction by pressure rollers. Each of the endless-plate belts are surrounded by an endless steel belt or pressing band which is pressed against the material being pressed by way of the belt plates. In each of the chambers surrounded by the endless pressing band (viewed in the direction of motion of the adjacent sections of the endless-plate belt) at least one high pressure roller is disposed beyond the endless-plate belts, the diameter of said high pressure rollers being greater than the diameter of each pressure roller. The high pressure rollers which produce a high-pressure zone and are surrounded by the respective two endless pressing bands are mounted in the same vertical plane. At least one of the high pressure rollers is drivable, and at least one of these high pressure rollers is movable in the direction of the other with an adjustable pressure force, and the pressure between the high pressure rollers is much higher than the pressure between the pressure rollers acting on the plate belt (low-pressure zone).

Although presses of the type referred to above have operated satisfactorily, especially when used as prepresses, they suffer from the disadvantage that the sliding elements disposed between the outlet of the endless-plate belts and the high pressure rollers forming the high-pressure zone, said sliding elements being designed to prevent the prepressed mat from springing off, are subject to relatively rapid wear. This can be eliminated by providing the surfaces of the sliding elements which face the endless steel belt (pressing band) with a coating which reduces the frictional forces which develop, for example, a coating of Teflon. Such a solution has certain advantages, but is not an optimum solution for all cases.

Therefore, an object of the invention is to improve the above-mentioned presses in such manner that there is practically no further wear of the parts which are designed to prevent the mat from springing off at least beyond the endless-plate conveyors. Moreover, the present invention is designed to prevent springing off of the material beyond the high pressure rollers that form the high-pressure zone. These and other objects are achieved according to the invention by surrounding each of the high pressure rollers forming the high-pressure zone with a high pressure endless belt disposed between the roller and the endless steel belt (pressing band). In particularly preferred embodiments, the high pressure belt is formed of polyamide material with said high pressure belt being guided over a reversing roller, said reversing roller being designed as a pressure means for the high pressure belt, being provided against and next to the endless steel belt (pressing band) surrounding the corresponding endless-plate belt. Particularly preferred embodiments also include the provision that the endless polyamide belts are of a thickness such that springing off of the mat pressed in the low-pressure zone is prevented. This is accomplished by converting the previous sliding friction into rolling friction, with much less resistance. Tests have shown that endless polyamide belts should have a thickness of about 4 mm. Although such an endless polyamide belt 4 mm thick is relatively stiff, long-term tests have shown that this belt is not damaged, although it is deformed around radii of curvature between 225 mm and 750 mm. Thus, for example, the rollers acting as the pressure means against the polyamide belt on the endless steel belt have a diameter of 450 mm, the high pressure rollers forming the high-pressure zone have a diameter of 1500 mm, and the reversing rollers provided with control means have a diameter of 660 mm; in other words the radius of curvature of the endless polyamide belt is constantly undergoing change.

Furthermore, it is provided in preferred embodiments that a second reversing roller is present for each endless polyamide (high pressure) belt, said second reversing roller being provided with control means to prevent the endless polyamide belt from shifting sidewise.

According to other preferred embodiments, three reversing rollers are provided for each high pressure endless polyamide belt, wherein the third reversing roller as viewed from the direction of movement of the corresponding endless polyamide belt is disposed beyond the high pressure roller forming the high-pressure zone and the spacing of the rotational axes of this third reversing roller must be set such that the space between the outer endless belts (pressing bands), which preferably consists of steel or plastic, is precisely the same size in the vicinity of the third reversing roller as in the vicinity of the high pressure rollers that form the high-pressure zone. This arrangements provides that the mat, compressed by the high pressure rollers forming the high-pressure zone, is able to spring back only on a delayed basis, which is particularly important in the manufacture of thick boards to avoid cracks. If the continuously operating press is stopped for some reason, the part of the mat which is influenced by the high-pressure rollers forming the high-pressure zone is subject to practically linear influence and this differential thickness of the mat would lead to crack formation when the press was started again. These cracks are advantageously avoided by providing the third reversing roller beyond the rollers forming the high-pressure zone.

It is also contemplated according to other preferred embodiments of the invention, to go one step further to improve the long-term resistance of the endless polyamide belts (high pressure belts) by providing more than three rollers for each endless polyamide belt and ensuring that the length of each endless polyamide belt is greater than the circumferential length of each of the endless-plate belts and smaller than the length of the corresponding outer endless belt. This reduces the number of changes caused by the variations in the radius of curvature of the reversing rollers and also results in a more uniform mat or a more uniform board path, because the polyamide belts which surround the endless-plate belt distribute over their outer surfaces the pressure exerted by the endless-plate conveyors and the pressure rollers. Moreover, the mat is prevented from springing back in the area between the endless-plate conveyors and the following rollers by this arrangement.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
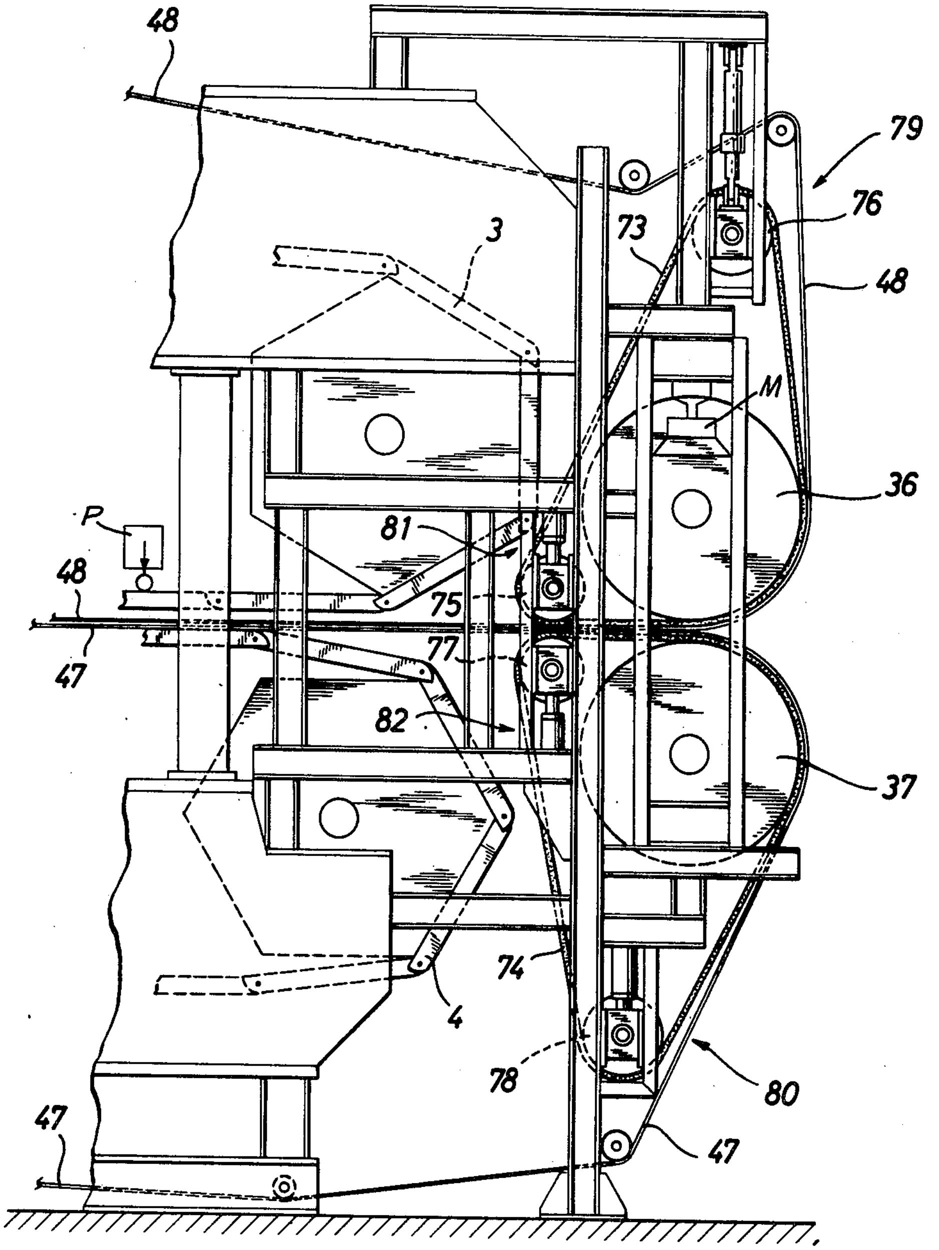
FIG. 1 is a partial schematic side view showing the outlet section of a continuously operating press with endless-plate conveyors, the rollers forming the high-pressure zone, and endless polyamide belts which are each guided over two reversing rollers, constructed in accordance with a first preferred embodiment of the invention.

In view of the state of the art, as exemplified by my above-noted U.S. Pat. No. 4,004,873, and in order not to obscure the present invention, the drawing figures and this description do not include certain details of the press such as the pressing means acting on the plates of the plate belts, and the driving means for the various belts. However, one skilled in the art should be readily able to practice the invention disclosed herein, especially in view of the incorporation by reference of my U.S. Pat. No. 4,004,873.

Throughout the various Figures, like reference numerals are used for like or similar structural features.

FIG. 1 shows only portions of the low-pressure zone of a continuously operating press, with the endless-plate conveyors or belts 3 and 4 mounted one above the other, each of which is surrounded by an endless belt or pressing band 48 or 47, whereby in the outlet area of the press two high pressure rollers 36 and 37 which form the high-pressure zone are disposed in the space surrounded by endless belts 48 and 47. In all embodiments illustrated, schematically depicted pressure applying means P, such as piston-cylinder mounted rollers, force the plate sections against the pressing band 48 in a manner disclosed in more detail in my above-mentioned U.S. Pat. No. 4,004,873. The upper pressure rollers 36 are preferably movably mounted with adjustably movable bearing supports M, such as piston-cylinder supports, in a manner also disclosed in more detail in my U.S. Pat. No. 4,004,873.

According to one aspect of the invention, each of the high-pressure rollers 36 and 37 forming the high-pressure zone is surrounded by an endless polyamide belt 73 or 74 disposed between it and the corresponding endless belt 48 and 47. The endless polyamide belts are guided over at least one reversing roller (75, 77), said reversing roller (75, 77) being designed to serve as a pressure means for pressing the endless polyamide belts against endless belts 48 and 47. In addition, an additional reversing roller 76 and/or 78 is provided. Rollers 76 and 78 are provided with a control means 79 and 80 to prevent the endless polyamide belts from shifting sidewise. Rollers 75 and 77, designed as the pressure means and influenceable by pressure cylinders 81 and 82, are disposed one above the other exactly like the high pressure rollers 36 and 37 forming the high-pressure zone, so that in the area in which polyamide belts 73 and 74 are in contact with endless belts 48 and 47, pressure forces can be exerted which are higher than the pressure forces exerted by the low-pressure rollers (not shown here) on endless-plate conveyors 3 and 4.

Essentially, it would suffice to guide endless polyamide belts 73 and 74 only around rollers 75 and 36 and 77 and 37, but this would pose certain difficulties, as far as preventing the two endless polyamide belts from shifting sidewise is concerned. It is more advantageous to achieve a solution using reversing rollers 76 and 78, because the sidewise slippage of the endless polyamide belts can then be controlled more precisely.

Figure 2:
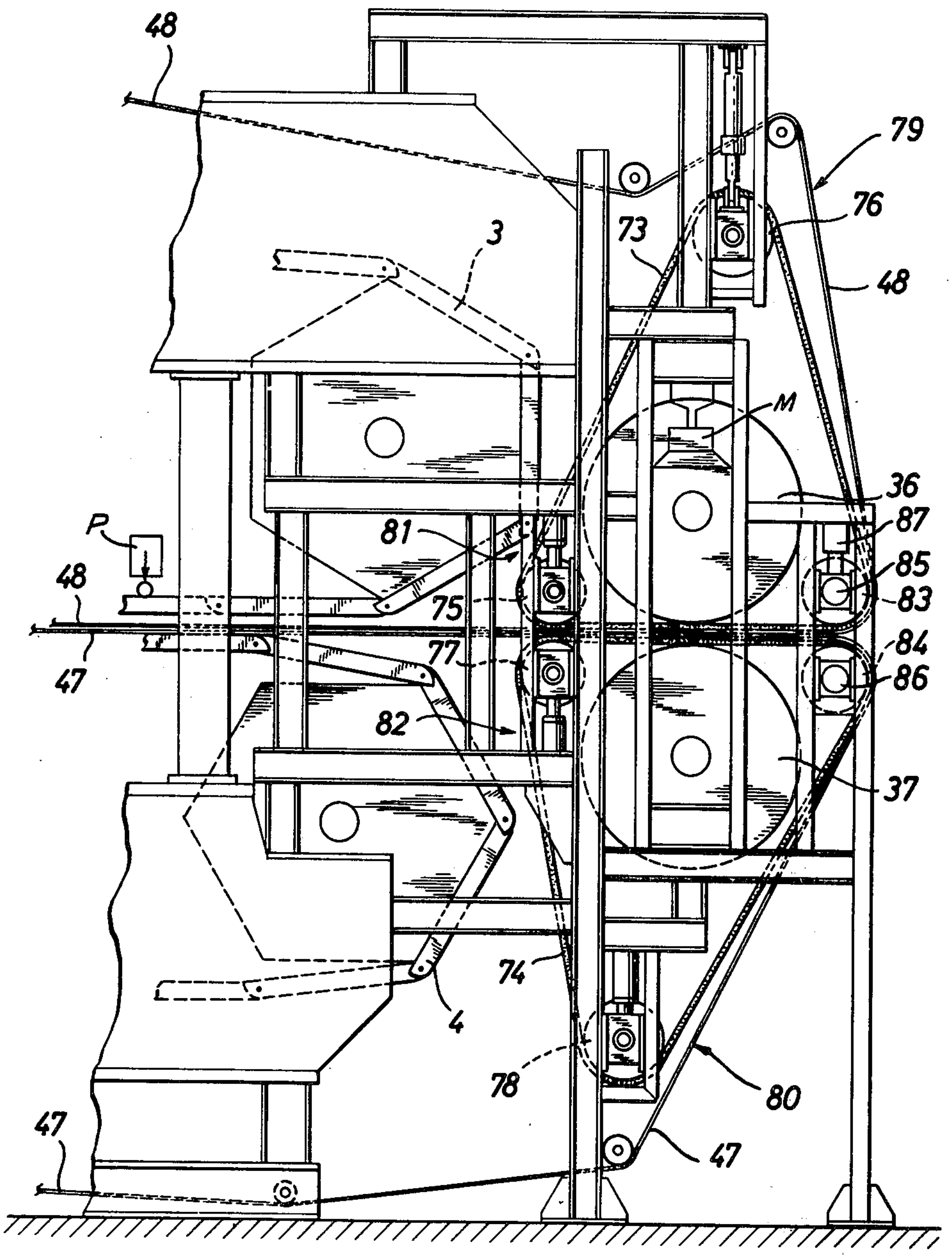
FIG. 2 is a view similar to FIG. 1, which shows a second preferred embodiment of the invention, with three reversing rollers.
Figure 3:
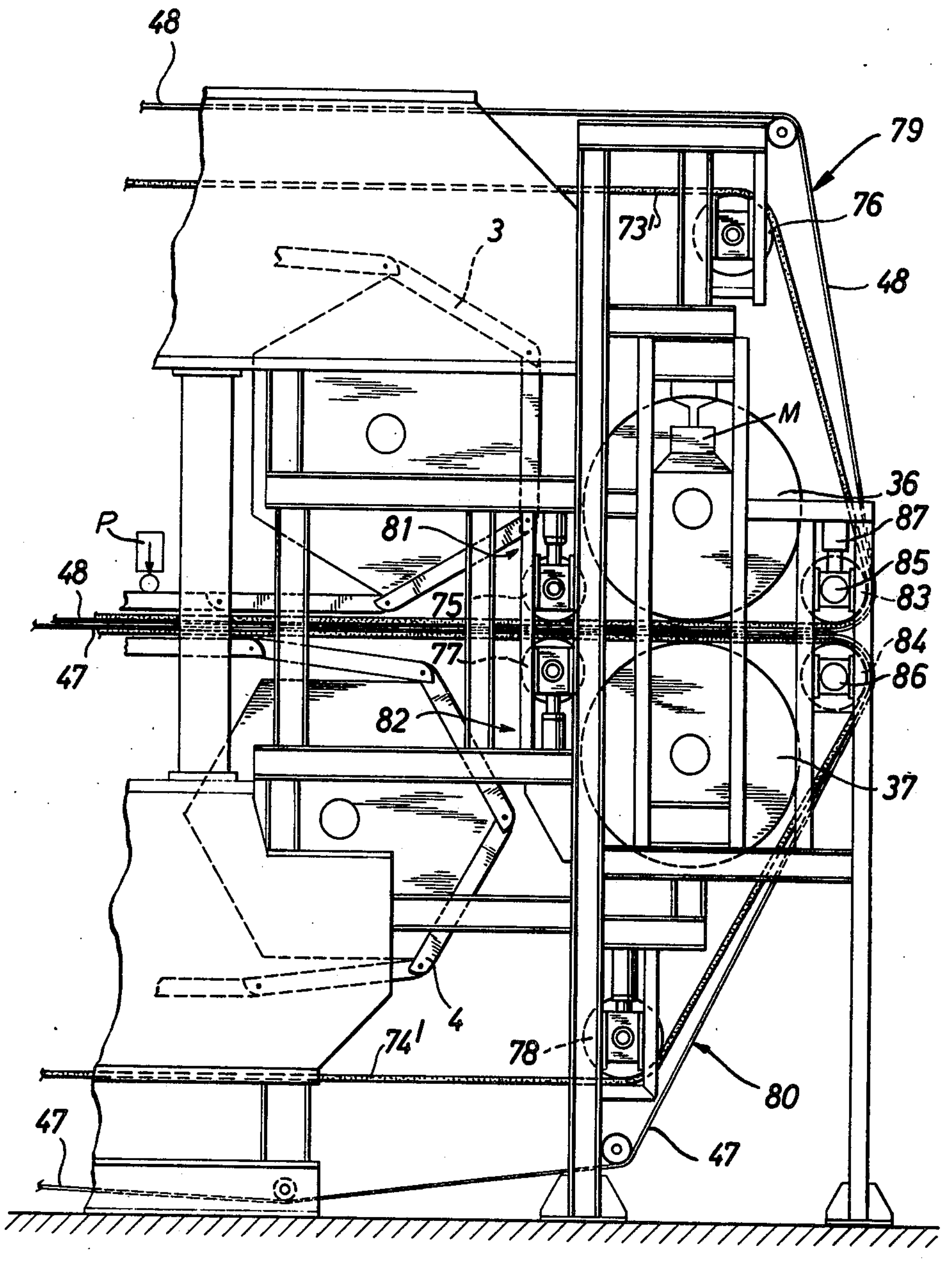
FIG. 3 is a view similar to FIG. 1, which shows a further preferred embodiment of the invention, modified in such fashion that the endless polyamide belts which surround the rollers forming the high-pressure zone are also guided around the endless-plate belts.

Likewise, in FIGS. 2 and 3, only the low-pressure zone of a continuously operating press is shown by the endless-plate conveyors 3 and 4 mounted one above the other, each of which is surrounded by an endless belt 48 or 47, whereby in the outlet area of the press the two high-pressure rollers 36 and 37 forming the high-pressure zone are disposed in the areas surrounded by endless belts 48 and 47.

Each of the high-pressure rollers 36 and 37 forming a high-pressure zone is surrounded by an endless polyamide belts 73 and 74 disposed between it and the corresponding outer endless belt 48 or 47, said endless polyamide belt being guided over three reversing rollers 75, 76 and 83 and 77, 78 and 84, with reversing rollers 75, 83, and 77, 84 being designed to serve as pressure means to press endless polyamide belts against the outer endless belts 48 and 47, while reversing rollers 78 and 78 are provided with control means 79 and 80 to prevent these endless polyamide belts from shifting sidewise. Rollers 75, 83 and 77, 84 designed as pressure means are disposed one opposite the other in exactly the same manner as rollers 36 and 37 which form the high-pressure zone. The compressive forces exerted by rollers 75 and 77 via endless polyamide belts 73 and 74 and endless belts 48 and 47 are dimensioned such that the mat compressed by the endless-plate conveyors 3 and 4 via endless belts 48 and 47 cannot spring back. The same is true of rollers 83 and 84 with respect to the compressive forces which are exerted by high-pressure rollers 36 and 37. Therefore, one must ensure that the space between rotational axes 85 and 86 of reversing rollers 83 and 84 are spaced such that the space between the outer endless belts 47 and 48 in the area of the third reversing rollers 83 and 84 is exactly the same size as in the vicinity of rollers 36 and 37 forming the high-pressure zone.

To adjust the pressure or vary the spacing of reversing rollers 75 and 77 and 83, adjustable pressure cylinders (fluid operated piston-cylinder devices) 81, 82 and 87 are mounted on the corresponding reversing rollers.

Reversing rollers 83 and 84 can also be provided on continuously operating presses which do not have endless-plate conveyors, but only a plurality of rollers around which the endless polyamide belts are guided, because then the compressed mat could be prevented from springing back and crack formation could be prevented.

The embodiment shown in FIG. 3 differs from the embodiment in FIG. 2 essentially only in that endless belts 73′ and 74′ are brought around between the outer endless belts 48 and 47 and endless-plate conveyors 3 and 4, so that the change in the radius of curvature during each cycle of an endless polyamide belt is reduced and the expansion of the precompressed mat leaving the low-pressure zone is avoided up to rollers 75 and 77. Also, the belts 73′ and 74′ are necessarily longer than the respective plate belts and shorter than the pressing bands 47, 48.

While I have shown and described various embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A press for producing boards such as chipboards, fiberboards, and the like; said press comprising:

- a movable endless plate belt formed from a plurality of articulated belt plates,
- an endless material pressing band surrounding and movable with the plate belt,
- a high-pressure roller positioned downstream of the plate belt within the interior space defined by the pressing band, said high-pressure roller being arranged to force the pressing band against material being pressed after said material has been preliminarily pressed by said belt plates pushing against said pressing band,
- material support means for supporting said material as it is being pressed against by said pressing band,
- and a high-pressure endless belt surrounding said high-pressure roller and running between said high-pressure roller and said pressing band, said high-pressure endless belt serving to transmit pressing forces between said high-pressure roller and said pressing band.

2. A press according to claim 1, wherein reversing roller pressure means for said high-pressure endless belt are disposed in said interior space, said reversing roller pressure means being disposed to force said pressing band against said material at positions spaced from the point of pressing forces exerted by said high-pressure roller against said pressing band, whereby high-pressure pressing forces against said pressing band are distributed over the travel path of said high-pressure endless belt between said high-pressure roller and said reversing pressure roller means.

3. A press according to claim 2, wherein said high-pressure endless belt is formed of polyamide and is of such a thickness as to prevent springing off of the material previously pressed in the lower-pressure zone against the plate belt.

4. A press according to claim 2, wherein said reversing pressure roller means consists of a single reversing pressure roller.

5. A press according to claim 2, wherein a reversing roller is disposed in said interior space at a position spaced from the travel path of said pressing band, said reversing roller being provided with control means for preventing sideways shifting of the high-pressure endless belt.

6. A press according to claim 1, wherein a plurality of reversing rollers are provided in said interior space for guiding the travel path of said high-pressure endless belt, and wherein the length of the high-pressure endless belt is greater than the length of the plate belt and smaller than the length of the pressing band.

7. A press according to claim 6, wherein said plurality of reversing rollers includes more than three reversing rollers.

8. A press according to claim 2, wherein a plurality of reversing rollers are provided in said interior space for guiding the travel path of said high-pressure endless belt, and wherein the length of the high-pressure endless belt is greater than the length of the plate belt and smaller than the length of the pressing band.

9. A press according to claim 2, wherein said reversing roller pressure means includes two reversing pressure rollers disposed respectively, upstream and downstream of the high-pressure roller, and wherein reversing roller control means are provided for varying the pressure exerted by at least one of said reversing pressure rollers against said high-pressure endless belt and said pressing band.

10. A press according to claim 2, wherein said high-pressure roller is rotatably driven.

11. A press according to claim 2, wherein a similar second arrangement of a plate belt, pressing band, high-pressure roller, and reversing roller pressure means is provided, the pressing bands having respective facing travel path portions between which said material is pressed.

12. A press according to claim 11, wherein said high-pressure endless belts are formed of polyamide and are of such a thickness as to prevent springing off of the material previously pressed in the lower-pressure zone adjacent the plate belts.

13. A press according to claim 11, wherein three reversing rollers are provided for each high-pressure endless belt of which reversing rollers the third reversing roller, looking in the direction of the corresponding high-pressure endless belt, is disposed beyond the high-pressure rollers, and wherein the distance of the rotational axes of these third reversing rollers from one another is set such that the space between the pressing bands in the vicinity of the third reversing rollers is exactly the same size as in the vicinity of the high-pressure rollers forming the high-pressure zone.

14. A press according to claim 11, wherein a reversing roller is disposed in each of said interior spaces at respective positions spaced from the travel path of said respective pressing bands, said reversing rollers being provided with control means for preventing sideways shifting of the high-pressure endless belts.

15. A press according to claim 11, wherein said plate belts are mounted one above the other and are guided around axes disposed horizontally and parallel to one another, wherein drive rollers are provided for driving the plate belts with facing runs moving in the same direction, wherein pressure rollers are provided for pushing said plates of one plate belt toward the plates of the other plate belt, wherein said high-pressure rollers have a diameter substantially greater than the diameter of said pressure rollers, wherein said high-pressure rollers are mounted in the same vertical plane, wherein at least one of said high-pressure rollers is rotatably driven, and wherein at least one of said high-pressure rollers is adjustably movable in the vertical plane to adjust the compressive force exerted by said high-pressure rollers against the high-pressure endless belts and the pressing bands.

16. In a double belt press including two endless plate belts formed from a plurality of articulated belt plates and rotating about polygonal drums, said press further comprising an endless pressing band surrounding and moving with each plate belt, at least one large diameter high-pressure roller positioned downstream of each plate belt within the interior space defined by each endless band, the large diameter high-pressure rollers being arranged in pairs, one large diameter high-pressure roller of each pair being positioned within the interior space of one endless band the other large diameter high-pressure roller of each pair being positioned in the interior space of the other endless band, said large diameter high-pressure rollers being arranged to exert a pressure on the material passing therebetween, the improvement comprising a high-pressure endless belt surrounding each of said high-pressure rollers and running between said high-pressure rollers and the respective associated endless band, said high-pressure endless belts serving to transmit pressing forces between said high-pressure rollers and said endless bands.

17. A press for producing boards such as chipboards, fibreboards, and the like, said press comprising: at least one movable endless belt means mounted between a plurality of roller means, an endless material pressing band surrounding and movable with the belt means, a high-pressure roller positioned downstream of the belt means within an interior space defined by the pressing band, said high-pressure roller being arranged to force the pressing band against material being pressed after said material has been preliminarily pressed by said belt means pushing against said pressing band, material support means for supporting said material as it is being pressed against by said pressing band, and a high-pressure endless belt surrounding said high-pressure roller and running between said high-pressure roller and said pressing band, said high-pressure endless belt serving to transmit pressing forces between said high-pressure roller and said pressing band.

18. A press according to claim 17, wherein said at least one movable endless belt means is a polyamide belt.

19. A press for producing boards such as chipboards, fiberboards, and the like; said press comprising:

an endless material pressing band, pressure applying means for applying pressure on said pressing band to force said pressing band against material being pressed, a high-pressure roller positioned downstream of the pressure applying means within an interior space defined by the pressing band, said high-pressure roller being arranged to force the pressing band against material being pressed after said material has been preliminarily pressed by said pressure applying means pushing against said pressing band, material support means for supporting said material as it is being pressed against by said pressing band, and a high-pressure endless belt surrounding said high-pressure roller and running between said high-pressure roller and said pressing band, said high-pressure endless belt serving to transmit pressing forces between said high-pressure roller and said pressing band.

20. A press according to claim 1, wherein said material support means includes a second endless material pressing band surrounding a second movable endless plate belt formed from a plurality of articulated belt plates, wherein a second high-pressure roller is positioned downstream of the second plate belt within the interior space defined by the second pressing band, said second high pressure roller being arranged in opposition to said first-mentioned high pressure roller to force the second pressing band against the material being pressed, and wherein a second high-pressure endless belt surrounds the second high-pressure roller and runs between said second high pressure roller and said second pressing band, said second high pressure endless belt serving to transmit pressing forces between said second high pressure roller and said second pressing band.

* * * * *